United States Patent

Hopgood et al.

Patent Number: 5,164,086
Date of Patent: Nov. 17, 1992

[54] ROTARY FILTER WITH EXTERNAL ADJUSTMENT OF BLOWBACK VALVE

[75] Inventors: Stephen W. Hopgood, Cumberland, R.I.; Lester Klein, Wareham, Mass.

[73] Assignee: Baker Hughes Incorporated, Houston, Tex.

[21] Appl. No.: 595,538

[22] Filed: Oct. 11, 1990

[51] Int. Cl.$^5$ .................... B01D 33/073; B01D 33/50
[52] U.S. Cl. ........................... 210/391; 210/393; 210/402
[58] Field of Search ............ 210/391, 393, 402, 217, 210/392

[56] References Cited

U.S. PATENT DOCUMENTS 2,352,303  6/1944  Young .......................... 210/393

Primary Examiner—Mary Lynn Theisen
Assistant Examiner—Matthew O. Savage
Attorney, Agent, or Firm—Choate, Hall & Stewart

[57] ABSTRACT

Rotary filter including a perforated, rotatable drum and at least one blowback valve located in close proximity to the interior surface of the drum. In a preferred embodiment, the blowback valve includes an opening adjacent the drum for the discharge of a gas and the opening includes at least one radial position adjusting device alignable with a hole in the perforated drum, whereby the radial position of the blowback valve in relation to the interior of the drum is adjustable externally through perforations in the drum. The external adjustment permits drums longer than possible with prior art rotary filters.

8 Claims, 4 Drawing Sheets

ROTARY FILTER WITH EXTERNAL ADJUSTMENT OF BLOWBACK VALVE

BACKGROUND OF THE INVENTION

This invention relates to rotary filters.

Rotary filters are used for efficient, cost-effective liquid-solids separation in many areas such as chemical, pharmaceutical, food processing and fuel/metallurgical industries.

Rotary vacuum filters typically include a perforated drum whose interior is maintained under vacuum. The drum rotates through a liquid/solid suspension and liquids and gases are drawn into the interior of the drum with the solids forming a cake on the exterior surface of the drum. The cake is discharged by a blowback valve or shoe fitted with very close clearances to the accurately machined inside surface of the cylinder. Gas such as air is forced through the blowback valve so as to effect removal of the cake. As will be appreciated by those skilled in the art, it is essential that the clearance between the blowback valve and the interior of the drum be maintained at the close design tolerance so that gas discharged through the blowback valve does not enter the interior of the drum which would degrade the vacuum and decrease the performance of the filter.

In prior art rotary filters, the blowback valves are generally composed of cast or fabricated machined segments which are mechanically fastened to each other with nuts and bolts and connected to a source of pressurized air. The clearance between the blowback valve and interior of the drum was adjusted in the prior art by loosening the bolting and jacking one or more of the segments in or out to adjust the running clearance between the blowback valve and inside diameter of the filter drum. This operation of necessity was performed through access hatches in an end face of the drum. That is, a service technician would reach or climb inside the drum through the access hatch to loosen the securing bolts and to retighten them after the blowback valve was jacked to the appropriate clearance. Since this operation had to be performed from either end of the filter unless the technician climbed inside, the maximum length of the filter was constrained to be on the order of four feet so that no valve was more than two feet from either end of the drum.

It is known that it is more cost-effective to increase the length of a rotary filter so as to increase the surface area of the drum as opposed to increasing drum diameter. Heretofore, however, it was not practical to increase the length of the drum because of the necessity of a technician reaching or climbing inside and performing the blowback valve adjustment. As will be seen hereinbelow, the present invention allows a rotary filter to be longer, and therefore, more cost-effective, than rotary filters known in the prior art.

SUMMARY OF THE INVENTION

The rotary filter, according to the invention, includes a perforated rotatable drum and at least one blowback valve located in close proximity to the interior surface of the drum. Radial position adjusting apparatus is provided which is alignable with a hole in the perforated drum so that the radial position of the blowback valve in relation to the interior of the drum is adjustable through the perforations in the drum. In a preferred embodiment, the blowback valve includes an opening adjacent to the drum for the discharge of a gas for removing the cake and the opening includes therein at least one radial position adjusting device which is alignable with a series of holes in the perforated drum. By inserting the appropriate tool, such as an Allen wrench, through a hole in the drum into the position adjusting device, one can adjust the radial position of the blowback valve. This operation is performed external to the surface of the perforated drum, eliminating difficult and time consuming operations within the drum through an access hatch.

In this preferred embodiment, the blowback valve or shoe is slidingly supported on a support structure extending from a pressurized gas manifold. The radial position of the blowback valve is adjusted by turning a threaded screw which moves the shoe toward or away from the interior of the perforated drum. Once the appropriate clearance is attained, a split ring clamp is tightened to secure the blowback valve to the supporting member.

A prior art rotary filter would typically require three to three and one half hours to adjust the radial location of the blowback valves. With the present invention, the operation can be performed in less than one hour. Further, as pointed out above, rotary filters six feet long and longer are now practical since the adjustment is accomplished substantially external to the drum through the holes in the drum.

DESCRIPTION OF THE PREFERRED EMBODIMENT

Figure 1:
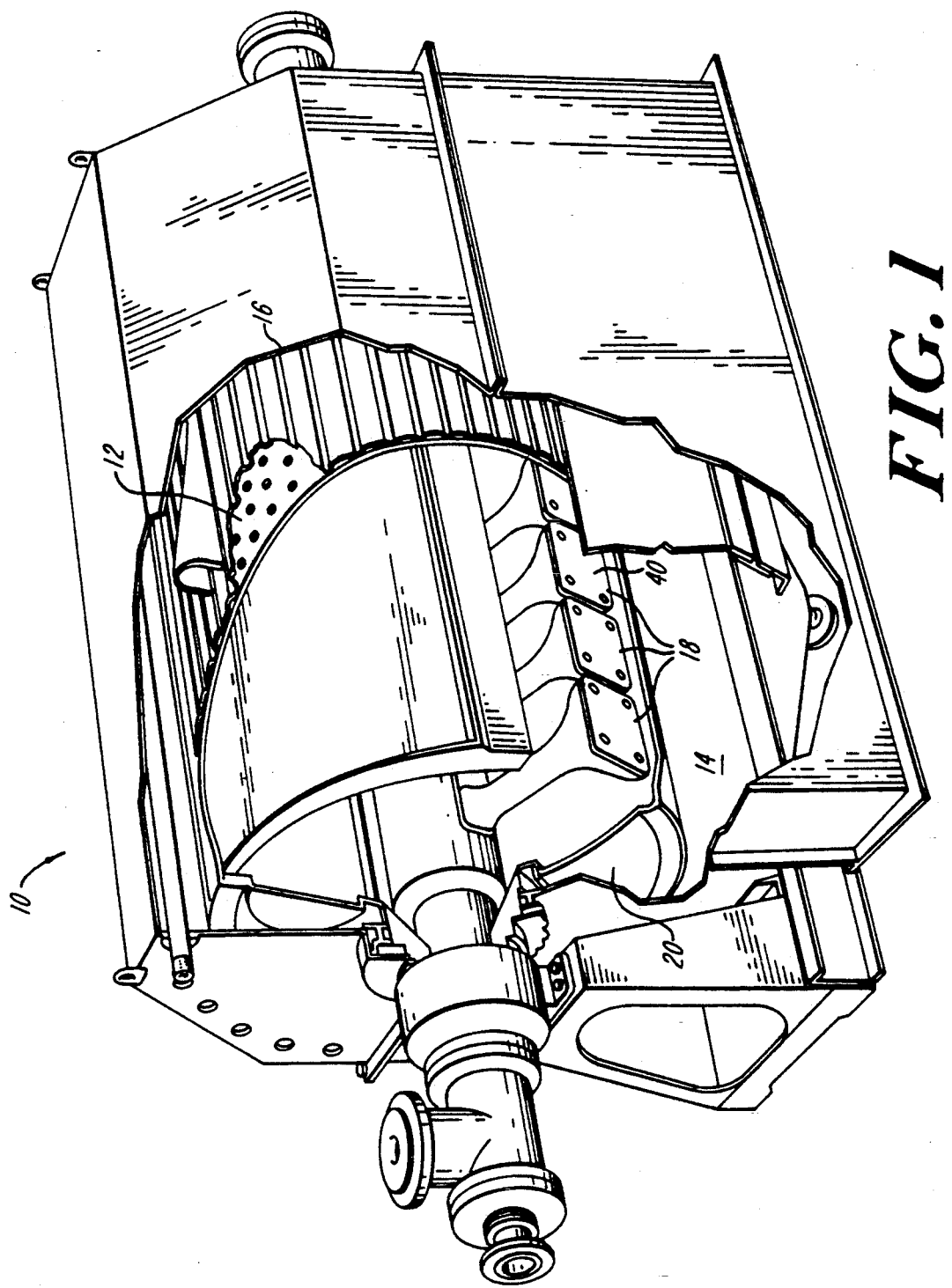
FIG. 1 is a perspective view, with parts broken away, of a rotary filter to which the present invention has application.

FIG. 1 is a schematic illustration of a rotary filter for which the present invention has application. In FIG. 1, a rotary filter 10 includes a perforated drum 12. A partial vacuum is maintained in the interior of the drum 12 by apparatus not shown. As the drum 12 rotates, it comes into contact with solid/liquid material to be separated located in a lower region 14 of the filter 10. Because of the vacuum maintained in the interior of the drum 12, liquids and gases in the material to be separated are drawn into the interior of the drum 12 and the solid portion deposits as cakes on a filter medium 16 which covers the external surface of the drum 12. The cake material must, of course, be discharged and this is generally accomplished pneumatically.

As shown in FIG. 1, there are provided a plurality of blowback shoes or valves 18 through which a pressurized gas such as air is discharged so as to effect removal of the cake from the drum 12. So, as the drum 12 rotates, successive sectors of the drum are exposed to the pressurized gas discharge through the blowback valves 18 to dislodge the solid cake. As those versed in the rotary filter art will recognize, the blowback valves 18 must be positioned very close to the interior surface of the drum 12. If the tolerance is not correct, some of the air passing through the blowback valves 18 will pass into the interior of the drum rather than through the perforations in the drum 12. Air entering the interior of the drum will diminish the vacuum which will degrade the performance of the rotary filter and cause greater energy consumption of the vacuum apparatus. It is therefore necessary to provide apparatus for adjusting the radial position of the blowback valves 18 with respect to the interior surface of the drum 12. In the prior art, adjustment of the radial position was accomplished by reaching or climbing through an access panel in an end wall 20 of the drum 12.

Figure 2:
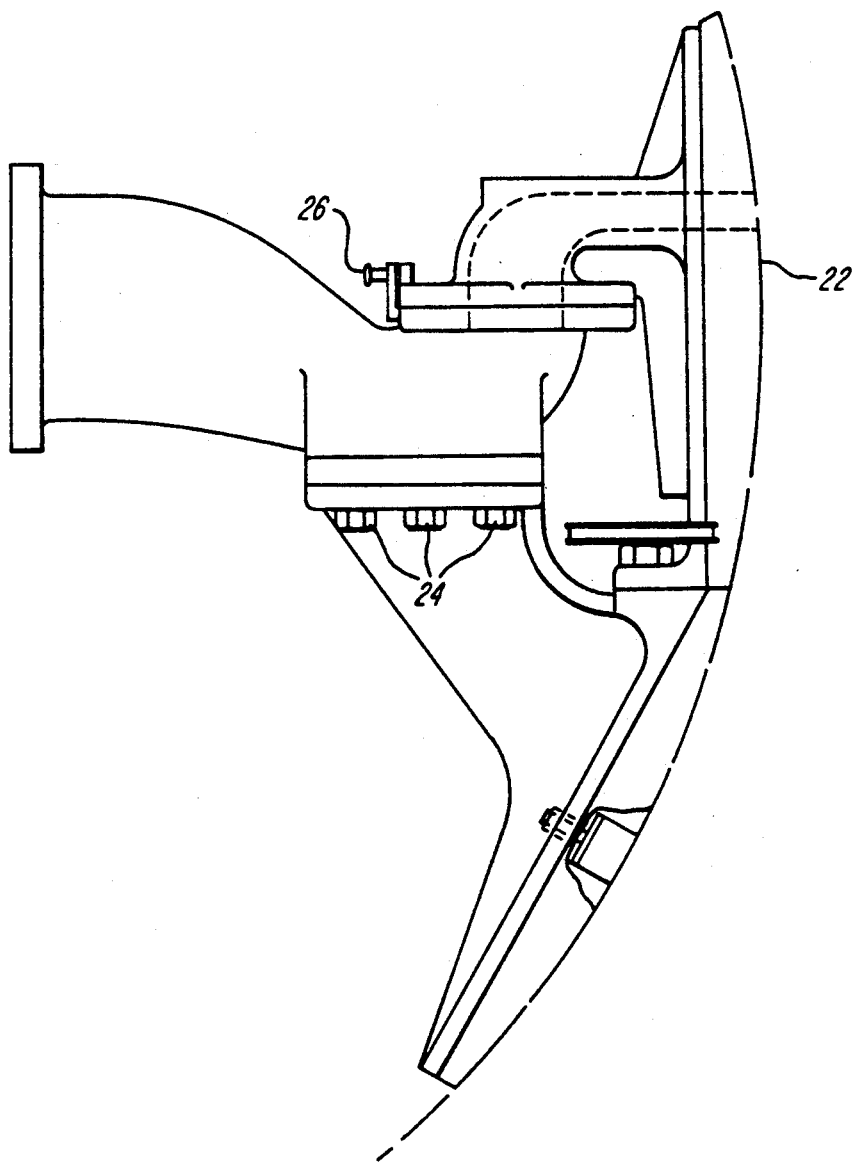
FIG. 2 is a cross-sectional view of a prior art blowback valve adjusting mechanism.

A prior art adjustment mechanism is shown in FIG. 2. In this prior art embodiment, blowback valves 22 are adjusted by first loosening the bolts 24 and then jacking the valves 22 forward or backward by rotating a screw 26. When the appropriate clearance was achieved, the bolts 24 are retightened. This whole operation requires a technician to reach in from an end face of the drum 12 to loosen the bolts 24 and to operate the jacking mechanism 26 and then to retighten the bolts. The length of the human arm restricts this operation to a range of approximately two feet. Since access was available from each of the two end faces of the drum 12, rotary filters could be no longer than approximately four feet. Alternatively, if the drum diameter and access were large enough for a person to enter the drum, then, of course, the rotary filter could be longer.

Figure 3:
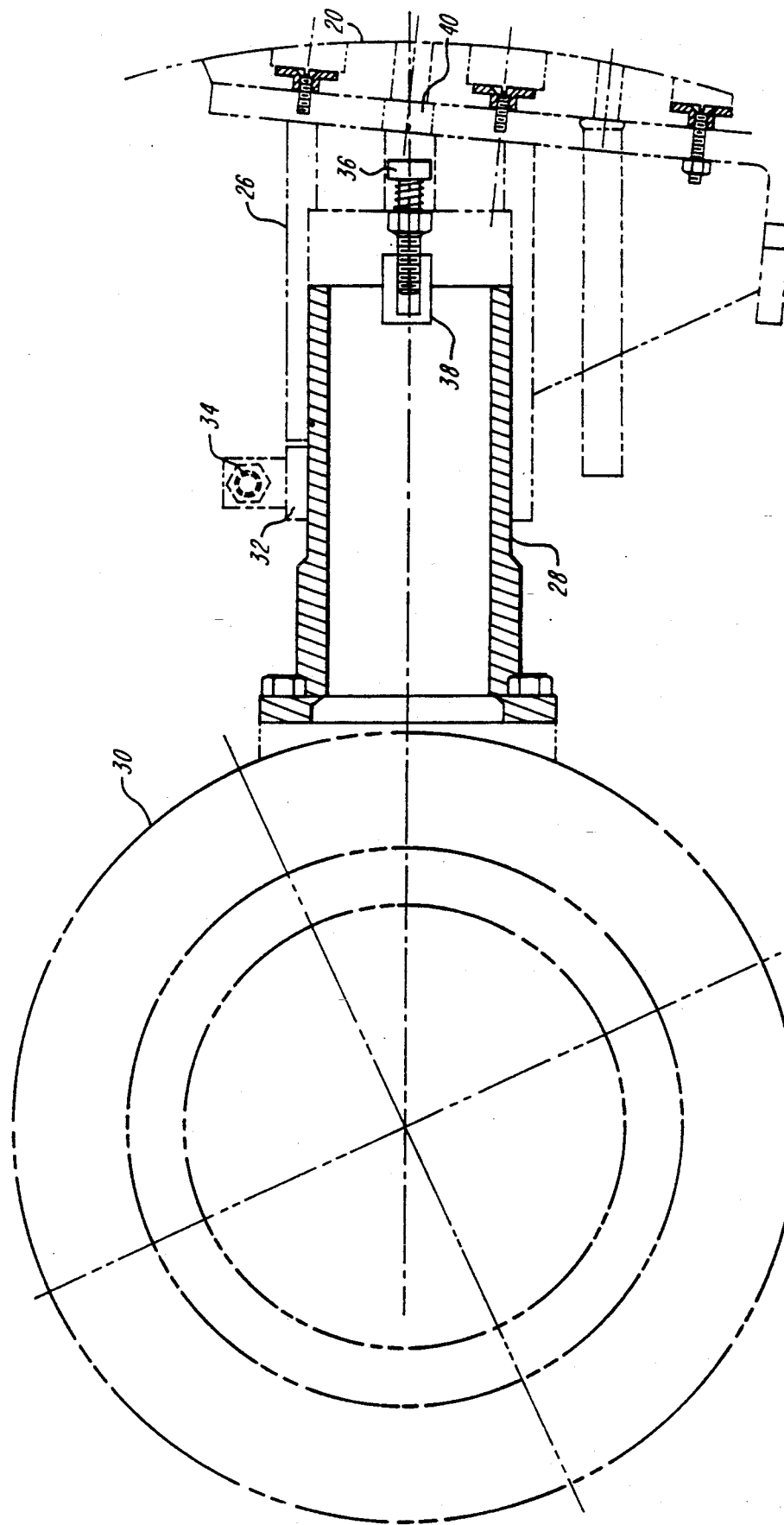
FIG. 3 is a cross-sectional view of the blowback valve adjusting mechanism according to the present invention.

According to the present invention, a substantial portion of the adjusting operation is accomplished external to the drum through the perforations in the drum. FIG. 3 illustrates a preferred embodiment of the invention. In this embodiment, the blowback valves 22 are supported on a cylindrical member 26 which slides over another cylindrical member 28 which is rigidly affixed to a manifold 30 which supplies the high pressure gas to the blowback valve 22. The cylindrical portion 26 includes a split ring clamp section 32 which upon turning of a bolt 34 will clamp the cylindrical member 26 to the cylindrical portion 28. The radial location of the blowback valve 22 is adjusted by turning a screw 36 which engages a threaded portion 38 affixed to the member 28. The screw 36 is located behind a slot 40 (see also FIG. 1) through which the compressed air is discharged. The perforations in the drum 12 are selected so that they will align substantially directly over the screw 36. Those skilled in the art will appreciate that the adjusting apparatus need not be within the blowback valve face, but may be located outside of and adjacent to the valve face. What is important is that the adjusting operation be performable through the drum from the outside, rather than from inside the drum as in the prior art.

Figure 4:
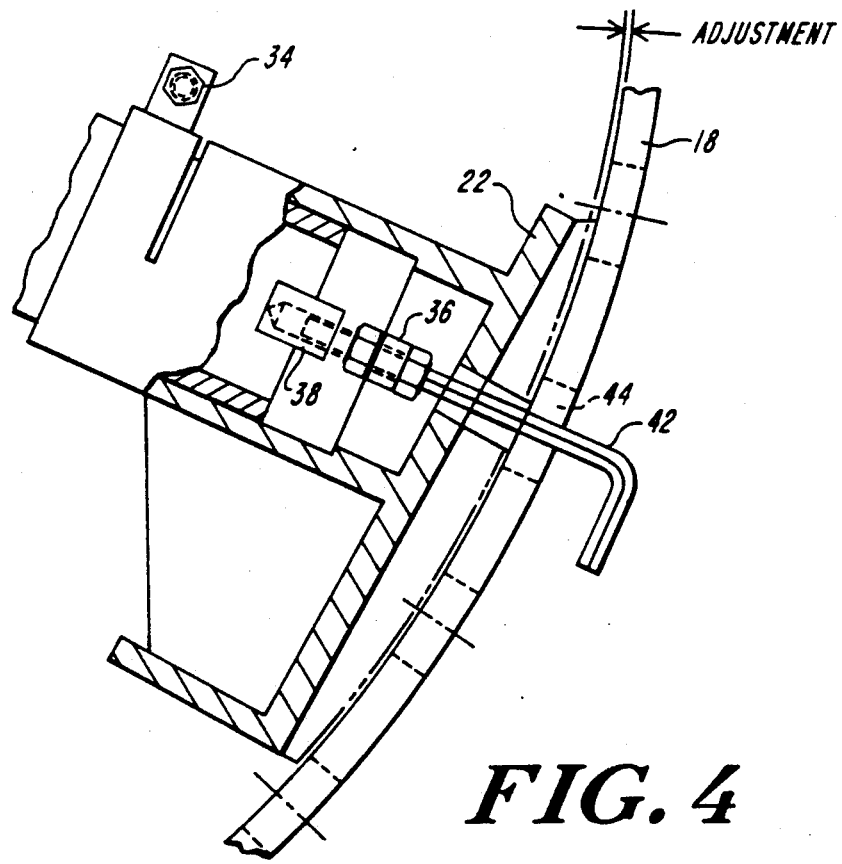
FIG. 4 is a cross-sectional view of the adjusting mechanism.
Figure 5:
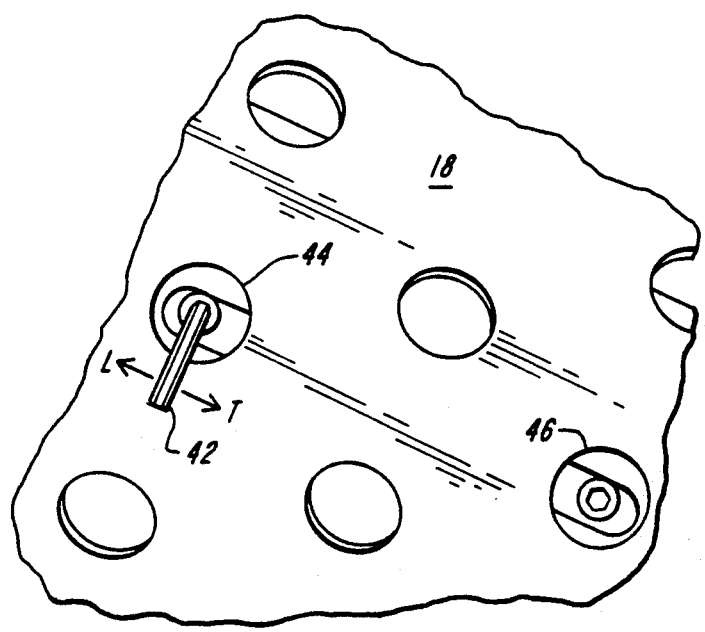
FIG. 5 is a plan view of the adjusting mechanism of the invention.

With reference now to FIGS. 3, 4 and 5, the adjustment of the radial location of the blowback valve 22 is accomplished as follows. As a first step, a long handled wrench (not shown) is inserted through an access hatch in an end face of the drum and is used to loosen the bolt 34. The loosening of the bolt 34 and its subsequent retightening are the only operations which are performed through an access in an end face of the drum. Once the bolt 34 is loosened, an Allen wrench 42 is inserted through a hole 44 (one of the perforations) in the drum 18 and inserted into the screw 36. By turning the Allen wrench 42, the blowback valve 22 is moved toward or away from interior surface of the drum 18 as desired. When the appropriate clearance is achieved, the Allen wrench 42 is removed and the long handled wrench (not shown) is again used to tighten the bolt 34 so as to clamp the cylindrical member 26 tightly to its supporting member 28. This operation is repeated for each of the blowback valve assemblies which may be included in a rotary filter. In general, there may be two adjustment screws for each of the blowback valves and a second adjustment access is shown in FIG. 5 at 46.

Not only does the above described procedure permit longer and therefore more cost effective rotary filters, the adjustment operation is much less time consuming than the prior art techniques. Several blowback valves can be adjusted in less than an hour, as compared with several hours for the comparable prior art rotary filter. It is intended that all modifications and variations of the above described invention fall within the scope of the appended claims.

What is claimed is:

1. Rotary filter comprising:
   a perforated rotatable drum;
   at least one blowback valve;
   support means for support said at least one blowback valve in close proximity to an interior surface of the perforated drum; and
   screw means threadably engaged with said support means and fixed to said blowback valve for adjusting the radial position of the blowback valve relative to the interior surface of the drum upon rotation of said screw means;
   said screw means including tool engagement means alignable with at least one hole in said drum for permitting engagement and rotating of said screw means with a tool inserted through said at least one hole.

2. Rotary filter comprising:
   a perforated drum;
   at least one blowback valve;
   support means for supporting said at least one blowback valve in close proximity to an interior surface of the perforated drum, the blowback valve including an opening adjacent the perforated drum for the discharge of a gas, the opening being alignable with at least one hole in the perforated drum; and
   screw means threadably engaged with said support means and axially fixed to said blowback valve for adjusting the radial position of the blowback valve relative to the interior surface of the drum upon rotation of said screw means, said screw means being positioned radially inwardly of the opening of said blowback valve;
   said screw means including tool engagement means alignable with the opening in said blowback valve and at least one hole in said drum for permitting engagement and rotation of said screw means with a tool inserted through the opening of said blowback valve and said at least one hole.

3. The rotary filter of claim 2 wherein said support means includes a first member supported with the rotatable drum;
   a second member slidingly supported by said first member, said second member being attached to the blowback valve; and
   said threaded screw means interconnects the first and second members, wherein upon rotation of the threaded screw means the second member moves relative to the first member so as to adjust the radial position of the blowback valve.

4. The rotary filter of claim 3 further including clamp means for securing together the first and second members.

5. The rotary filter of claim 4 further including a long handled wrench adapted for activating the clamp means.

6. The rotary filter of claim 3 further including
   a tool adapted for insertion through said at least one hole in the perforated drum and into the opening in the blowback valve for engaging with said tool engagement means of the threaded screw means.

7. The rotary filter of claim 3 wherein the first member communicates with a source of pressurized gas.

8. The rotary of claim 2 wherein
   the blowback valve includes two of said threaded screw means.

* * * * *

UNITED STATES PATENT AND TRADEMARK OFFICE
CERTIFICATE OF CORRECTION

PATENT NO. : 5,164,086

DATED : November 17, 1992

INVENTOR(S) : Stephen W. Hopgood and Lester Klein

It is certified that error appears in the above-identified patent and that said Letters Patent is hereby corrected as shown below:

Column 4, line 21, delete "for support" and insert therefor -- for supporting --; and line 32, delete "rotating" and insert therefor --rotation --.

Signed and Sealed this

Sixteenth Day of November, 1993

*Attest:*

BRUCE LEHMAN

*Attesting Officer*   *Commissioner of Patents and Trademarks*